US005271532A

United States Patent [19]

Jumel et al.

[11] Patent Number: 5,271,532

[45] Date of Patent: Dec. 21, 1993

[54] HAND PUMP UTILIZING PRESS FIT COMPONENTS FOR SEALING AND CLOSURE

[76] Inventors: Bernard Jumel, 4, avenue Henri, 60750 Choisy Au Bac; Fréderic Platel, Résidence Vert Bocage - Blvd Victor Hugo, 76260 Eu, both of France

[21] Appl. No.: 937,188

[22] Filed: Aug. 31, 1992

[51] Int. Cl.[5] ........................ B67D 5/42; G01F 11/00

[52] U.S. Cl. ........................ 222/321; 222/385

[58] Field of Search ........................ 222/321, 385, 402.1, 222/320, 372, 383

[56] References Cited

U.S. PATENT DOCUMENTS

| | | | |
|---|---|---|---|
| 2,861,839 | 11/1958 | Mellon | 222/385 X |
| 3,228,571 | 1/1966 | O'Donnell et al. | 222/385 X |
| 3,521,794 | 7/1970 | Bijl | 222/385 X |
| 3,526,343 | 9/1970 | O'Donnell et al. | 222/321 X |
| 3,556,353 | 1/1971 | Echols | 222/321 X |
| 3,920,164 | 11/1975 | Lindsoe | 222/385 |
| 3,937,366 | 2/1976 | Steiman | 222/321 |
| 4,050,860 | 9/1977 | Beres . | |
| 4,089,442 | 5/1978 | Hafela et al. | 222/385 X |
| 4,252,507 | 2/1981 | Knickerbocker | 222/321 X |
| 4,524,888 | 6/1985 | Tada | 222/321 X |
| 4,896,799 | 1/1990 | Giuffredi | 222/385 X |

FOREIGN PATENT DOCUMENTS

| | | | |
|---|---|---|---|
| 0025224 | 3/1981 | European Pat. Off. . | |
| 339125 | 11/1989 | European Pat. Off. . | |
| 85608 | 8/1895 | Fed. Rep. of Germany . | |
| 2800170 | 7/1978 | Fed. Rep. of Germany | 222/321 |
| 2374536 | 7/1978 | France . | |
| 351500 | 2/1961 | Switzerland | 222/385 |
| 230297 | 3/1925 | United Kingdom | 222/385 |

*Primary Examiner*—Kevin P. Shaver

*Attorney, Agent, or Firm*—Pollock, Vande Sande & Priddy

[57] ABSTRACT

A cylindrical pump body is axially disposed in a container and has an annular shoulder sealingly abutting an outer end of the container neck opening. The wall of the pump body is press fit against the interior wall of the container neck. A cylindrical sleeve is telescopingly press fit within an outer end portion of the pump body and has an annular collar sealingly abutting the pump body shoulder. The press fit between these components as well as their abutting annular sections ensures securement of the components within the container as well as the sealing of container contents therein without the use of threaded closures of gaskets.

5 Claims, 2 Drawing Sheets

HAND PUMP UTILIZING PRESS FIT COMPONENTS FOR SEALING AND CLOSURE

FIELD OF THE INVENTION

The present invention relates to a manually controlled atomizer-doser device of the type comprising a mechanical pump with a piston and plunger providing the suction of a liquid to be atomized which is delivered to a spray nozzle. Embodiments of such devices are described in particular in EP-A-0,025,224 and FR-A-2,374,536.

BACKGROUND OF THE INVENTION

In a general way, such atomizer-doser devices are designed in particular for the dispensing of liquid or viscous products, in small doses, for example samples of perfumes or of cosmetics or of pharmaceutical products.

In the devices of this type known at present (U.S. Pat. No. 4,050,860 and FR-A-2,374,536), the body which comprises the mechanism of the pump has to be mounted on the receptacle containing the liquid to be atomized through the intermediary of a bushing or the like having a triple function:

assembly and mounting of the body onto the receptacle by coupling of the inner diameter of this bushing onto the outer diameter of the neck of the receptacle;

closure of the body while retaining the mechanism of the pump with piston which is subject to the force of a return spring and;

creation of a leaktight connection between the atomizer-doser system and the neck of the receptacle with, if required, the interposition of a seal for leaktightness.

This bushing, at present considered essential by the person skilled in the art in order to constitute the atomizer-doser assembly, may be constructed in various forms of execution such as, in particular, bushings to be screwed, bushings to be crimped, sleeves to be snapped home and other types of bushings of known types.

Although the use of such a bushing proves satisfactory in the context of conventional applications for atomizer-doser devices delivering doses smaller than 50 μl, it has, in the case of adaptation to small receptacles and/or small apertures, major disadvantages, in particular:

a bulky geometry which stands in the way of a miniaturization of the atomizer-doser device and also of the receptacle on which it is mounted and which contains the liquid to be dispensed;

an extra production cost, due to the presence of the bushing which constitutes an additional component and which requires an assembly operation which is also additional, this extra production cost being of course unacceptable in the case of mass production applications, particularly for samples of perfumes where a low cost price is sought.

BRIEF DESCRIPTION OF THE INVENTION

The present invention therefore proposes to provide an atomizer-doser device which does not have the abovementioned disadvantages of the solutions according to the prior art and which makes it possible to dispense with precision very small doses varying, for example, between 35 and 45 μ.

To this end, the invention relates to an atomizer-doser system for liquid or viscous products comprising a pump of the mechanical type with a piston positioned in a receptacle containing the product to be dispensed, wherein the body of said pump is force-fitted into the neck of the receptacle, the upper part of said body terminates with a collar which abuts against the neck and means are provided on said body in order to ensure the escape of air from the receptacle when the body is fitted therein, a vent hole made in the body opening onto said means.

According to the invention, the vent hole can be placed under a step of the body which is provided between the upper cylindrical part of the latter, force-fitted into the neck of the receptacle and its lower part of small diameter. According to a variant, the means for ensuring the escape of air during the fitting operation consist of a groove made in the outer cylindrical surface of the pump body onto which groove the vent hole opens.

According to another feature of the present invention, the atomizer-doser system comprises a sleeve force-fitted into the upper part of the body, this sleeve terminating at its upper part with a collar abutting against the collar provided on said body.

According to the invention, the lower part of the piston of the pump is provided with a skirt which has an annular lip which, at rest, is maintained under a radial stress, said lip being wedged between a collar, provided at the lower end of the piston, and the interior of the pump body, the vent hole possibly being provided under the lip of said skirt.

Other features and advantages of the present invention will become apparent from the description given below with reference to the accompanying drawings, in

DETAILED DESCRIPTION OF THE INVENTION

Figure 1:
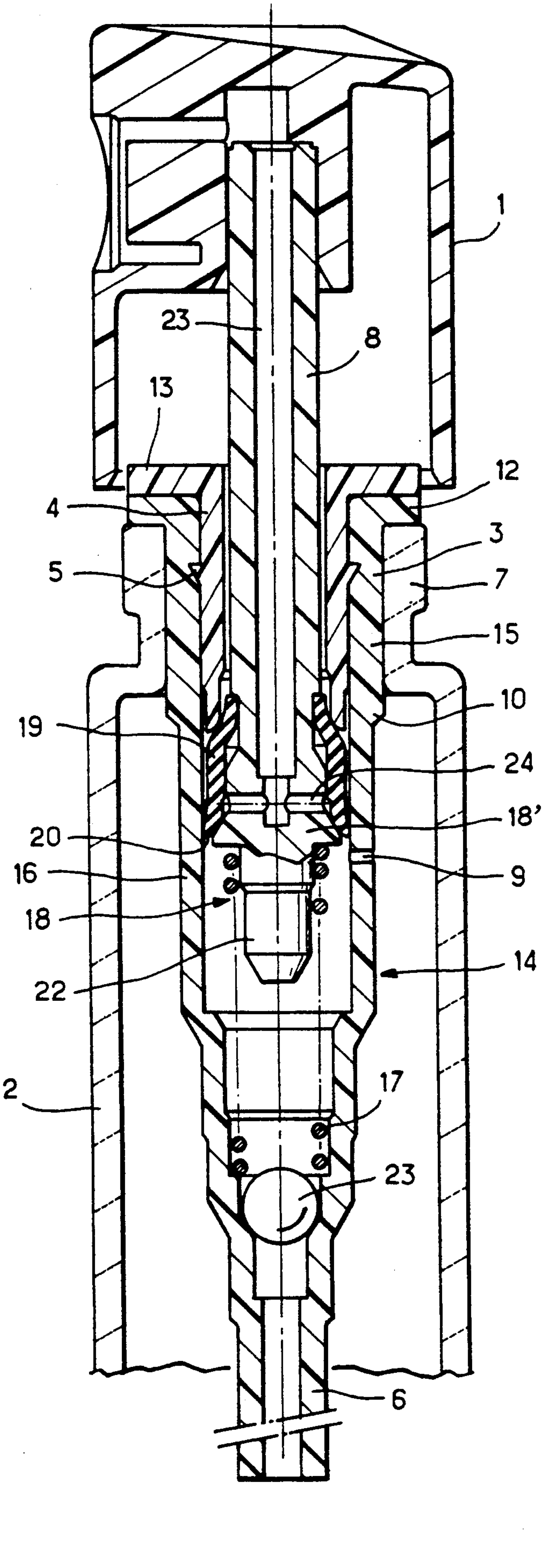
FIG. 1 is a view to a large scale, in longitudinal axial cross section, of an atomizer-doser system according to the present invention.

With reference to the drawings, the atomizerdoser device according to the present invention is seen to comprise, in this nonlimitative embodiment, a pump mechanism with piston generally designated by the reference 14 which is positioned on the receptacle 2, generally of glass or of plastic material, containing the product to be atomized, this receptacle being surmounted by an internally smooth and cylindrical neck 7. At its upper part, the pump with piston 14 is provided with a dispensing push-button 1.

According to the present invention, the body 3 of the mechanism of the pump is fitted inside the neck 7 of the receptacle, as is clearly seen in the drawing. This body 3 is here extended all in one piece, in its lower part, by an extraction tube 6 which is flush, as known, with the bottom of the receptacle 2. The upper part of the body 3 terminates with a collar 12 which abuts against the neck 7 of the receptacle 2. Over a height compatible with good retention of the body 3 and which is here slightly greater than the internal height of the neck 7, the outer part of this body is cylindrical and smooth and is gripped inside the neck 7, as can be seen in the figures. A seal is therefore produced by the fit at this level, the pump body corresponding perfectly in shape to the internal diameter of the neck of the receptacle. It will be noted that the pump body 3 may preferably be constructed of injected thermoplastic material of appropriate quality in order to guarantee a seal by conforming under resilient stress to the shape of the inside of the neck of the receptacle.

Figure 2:
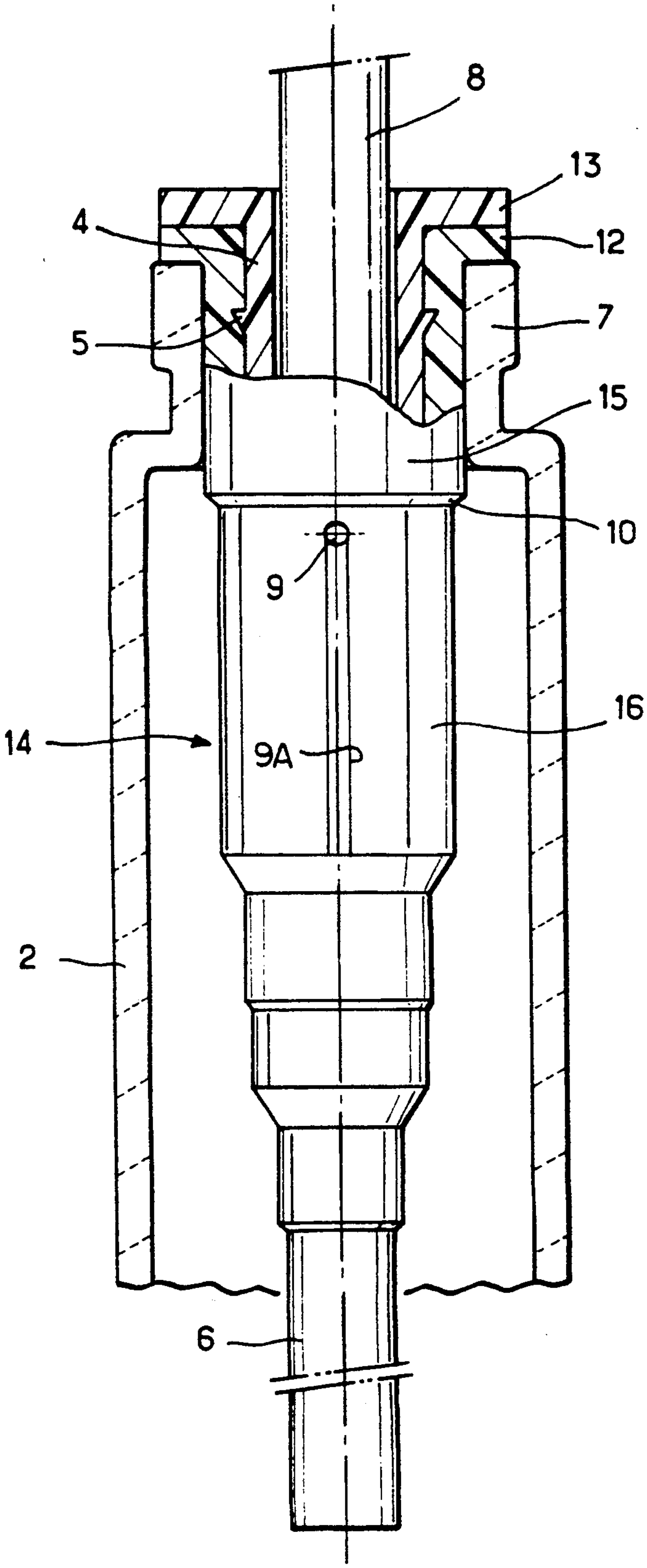
FIG. 2 shows the system according to the present invention in partial longitudinal axial cross section.

In this embodiment which is by no means of a limitative nature, the cylindrical part 15 of the body, on which the grip is exerted, is extended by a part 16 of cylindrical shape, the outer diameter of which is considerably smaller than that of the upper part 15 of the body and, in any case, smaller than the internal diameter of the neck. In the embodiment example shown in the drawings, a step 10 is provided between the upper part 15 and lower part 16 of the pump body. A lateral vent hole 9 opens onto the outside, this vent hole being situated under the step 10. The presence of this vent hole makes it possible to ensure a venting of the air pressure which is produced inside the receptacle 2 when the fitting of the pump body onto the neck of the receptacle is carried out. According to one variant, this venting can be obtained by providing an external groove 9A which is made in the cylindrical surface of the pump body and onto which opens said vent hole as shown in FIG. 2.

Inside the pump body, the operating mechanism of the pump tends, under the effect of an internal return spring 17, to return the rod 8 at the end of which is mounted the piston 16 of the pump, this rod being surmounted by the dispensing push-button 1. In order to retain and to position the rod 8 under the action of the return spring 17, a sleeve 4 is provided which is forcefitted inside the body 3 and which is surmounted by a collar 13 which abuts against the collar 12 of the body 3. The retaining of the sleeve 4 in the body 3 can be reinforced by providing coupling means such as 5, for example in the form of catches and grooves engaged in one another and provided respectively on the facing surfaces of the body 3 and of the sleeve 4, as is clearly seen in FIG. 1. In order to ensure a seal, in their top parts, the internal surface of the body 3 and the external surface of the sleeve 4 are smooth and of cylindrical shape and they are gripped together.

The lower part of the sleeve 4 constitutes the top stop of the pump mechanism and this stop positions the high point of the travel of the pump during operation. Consequently, the height of the sleeve 4 constitutes a decisive factor in the dose of products which can be atomized by the device according to the invention.

The dimensions and also the configuration of the sleeve 4 can be selected so that the latter constitutes the covering of the neck of the receptacle.

The rod 8 which, under the action of the pushbutton 1, actuates the mechanism of the pump, slides freely inside the sleeve 4 with a sufficient clearance, as can be seen in FIG. 1.

The action of fitting the pump body inside the neck of the receptacle may be performed by applying a bearing force on the upper part of the dispensing pushbutton 1. It will be noted that because of the absence of the outer bushing which, in the prior state of the art, is essential in order to ensure a seal between the pump body mechanism and the receptacle, the dispensing push-button 1 may be of a diameter greater than that of the collar 13 of the sleeve 4 or of the body 3 of the pump mechanism.

In the absence of any dispensing push-button 1 the force necessary for fitting the pump body onto the neck of the receptacle may be applied on the collar 13.

According to the invention, the depth of the fit is practically equal to the internal height of the neck 7 of the receptacle 2.

The three functions: assembly, closure-retaining of the internal mechanism of the pump and sealing are obtained, according to the invention, in the following manner:

the assembly is durably consolidated by the grip resulting from the fitting of the external diameter of the body 3 into the internal diameter of the neck 7 of the receptacle 2;

the closure of the body in order to retain the mechanism of the pump which is subject to the force of the return spring 17 is ensured by the presence of the sleeve 4 which is force-fitted inside the body and which forms a stop for gripping and for internal sealing. As has been seen above, this sleeve 4 is pushed in until the lower surface of its collar 13 abuts against the upper surface of the collar 12 of the body 3. The retaining of the internal mechanism of the pump body can be improved, as has been seen above, by the presence of coupling means 5, which guarantees the retaining of the sleeve in the body, this sleeve tending to be returned upwards under the action of the return spring 17 and;

the sealing function is of course ensured by virtue of the tight fit of the external diameter of the pump body on the internal diameter of the neck of the receptacle.

According to the invention the sealing of the pump is improved by the following arrangements:

the skirt 19 which, in known manner, is provided at the lower part of the piston 18 of the pump comprises a lip 20 which, at rest, is under radial stress, so as to be maintained wedged between the collar-shaped lower part of the piston 18' and the internal bore of the pump body. This arrangement increases the seal and also makes it possible to reduce the diameter of the pump by avoiding, for example, the construction of an internal member of the second skirt type in order to ensure a seal on the piston. The reinforcement of the flattening of the lip 20 against the pump body is ensured by the action of the spring 17 which presses the piston 18 onto the lip, which produces an effect of wedging of the lip.

the vent hole 9 which, in conventional manner, is provided through the pump body 3 can be positioned under the lip 20, which makes it possible to eliminate any possible leaks between the sleeve 4 and the upper part of the skirt 19, by limiting the paths of leaks, owing to a constant pressure in the receptacle. It will be noted that such a positioning of the vent hole is rendered possible particularly by the fact that the invention is preferably applied to receptacles of small capacity, which limits the actuation of the pump to a few tens of spray actions. Thus, the risks of damage to the lip 20 when it passes the vent hole are limited.

It will be noted that, owing to the arrangement according to the present invention, the pump can operate without a seal system.

The lower part 22 of the piston 18 of the pump is constructed so as to provide a double function: the centering of the spring 17 and the end-of-travel stop against the ball 25 provided, in conventional manner, in the extraction tube 6 at the upper part of the latter. During the fitting, when the base of the piston comes to a stop against the ball, it blocks the latter thus preventing any rising of the liquid at the time of the slight overpressure due to the fitting action.

The operation of this pump is similar to that of the piston-type pumps of atomizer-doser devices according to the above-mentioned prior state of the art and will not be described again. It will, however, be noted that the passage of the liquid into the channel 23 of the pump body, and via the transverse channel 24 can take place equally by deformation or by lifting of the skirt 19.

Among the advantages provided by the invention, the following can be cited in particular:

obtaining in a simple and inexpensive manner the coupling of the pump body onto the receptacle containing the product to be atomized, this coupling being produced with the smallest possible bulk, in contrast with the conventional coupling system requiring bushings, as has been seen above;

possibility of mounting on sample tubes. The handling of a sample tube in order to actuate an atomizer-doser system mounted at its end is very tricky, and the invention makes it possible to construct a pump having a very flexible operation, which allows this mounting;

the increased seal produced by means of the invention makes it possible to dispense very small doses, which increases the adaptability of the system according to the invention to sample tubes the capacity of which is very small (of the order of 1 to 2 $cm^3$), which necessitates the presence of a perfectly leak light pump, failing which the contents of the sample tube may be reduced, or even disappear, within a few weeks.

The device according to the present invention is preferably applied to receptacles of small capacity intended particularly for the market of the sampling of perfumes and cosmetics. As a nonlimitative example, the body of the pump may have a diameter of 5 mm compatible with a tight fitting of this body inside the necks of receptacles of drawn glass manufactured for this use, but which at present are closed by a simple stopper which renders the use of such sample tubes impractical. The device according to the invention can therefore be substituted for the current stoppers of these sample tubes making it possible to provide a sprayed release of the sample of perfume or a release in "blob" form for products of viscous consistency, particularly cosmetic products such as gels, oils, creams or milks. Of course, the invention can be applied to receptacles of larger capacity and to necks of greater diameter.

It remains clearly understood that the present invention is not limited to the examples of embodiments and/or of applications described and mentioned here but that it encompasses all variants thereof.

We claim:

1. A hand pump comprising:

a container having an outlet neck;

a cylindrical pump body having an outer annular shoulder abutting an outer end of the container neck, an outer surface section of the pump body press fit against a confronting interior surface of the neck for sealing the interfacing press fit surfaces;

a cylindrical sleeve coaxially disposed within an outward end section of the pump body and press fit thereagainst for sealing the interfacing press fit surfaces, the sleeve having an axially outer annular collar outwardly abutting the annular shoulder of the pump body;

an actuating piston rod axially disposed through the neck, the rod having a central axial material dispensing passageway formed therein;

a piston head located at in inward end of the rod and radially inwardly of a narrowed section to the pump body;

a diametrical cross channel formed through the piston rod and perpendicularly communicating with an inward end of the central axial rod passageway; and a radial vent hole formed in the narrowed section of the pump body for preventing over-pressurization of the pump body interior when the piston rod is assembled within pump body;

wherein the press fit surface of the neck, pump body, and sleeve material seal leakage through the container neck.

2. The hand pump set forth in claim 1 together with a groove formed on an outer surface of the pump body narrowed section and intersecting a radially outward opening of the vent hole.

3. The hand pump set forth in claim 1 together with mating detent means formed in the sleeve and the pump body for securing them together.

4. The hand pump set forth in claim 1 together with a skirt coaxially mounted around the piston head and movable therewith, the skirt having a lip for translationally sealing an annular gap existing between an inner wall of the pump body and the piston head.

5. The hand pump set forth in claim 4 further comprising:

an axial projection integrally connected to the piston head and extending inwardly therefrom;

a pump ball seated against an interior recess formed along the length of the pump body; and a spring centered at a first end by the projection and abutting the piston head, an opposite spring end seated in a recess formed in the pump body;

the projection adapted to seat the ball against its corresponding recess when the piston head is sufficiently axially displaced, thereby checking material flow past the ball.

* * * * *